United States Patent [19]

Obara

[11] Patent Number: 4,518,842
[45] Date of Patent: May 21, 1985

[54] METHOD OF CONTROLLING WIRE-CUT ELECTRIC DISCHARGE CONTOUR MACHINES ERRORS

[75] Inventor: Haruki Obara, Sagamihara, Japan

[73] Assignee: Fanuc Ltd., Minamitsuru, Japan

[21] Appl. No.: 452,141

[22] Filed: Dec. 22, 1982

[30] Foreign Application Priority Data

Dec. 30, 1981 [JP] Japan .................................. 56-210769

[51] Int. Cl.³ .............................................. B23P 1/08
[52] U.S. Cl. ................................ 219/69 W; 219/69 M
[58] Field of Search ............... 219/69 W, 69 R, 69 G, 219/69 M

[56] References Cited

U.S. PATENT DOCUMENTS

| 4,081,652 | 3/1978 | Janicke et al. ................... 219/69 W |
| 4,232,208 | 11/1980 | Buhler ............................ 219/69 W |

FOREIGN PATENT DOCUMENTS

| 2502288 | 1/1975 | Fed. Rep. of Germany . |
| 2635766 | 9/1976 | Fed. Rep. of Germany . |
| 2748454 | 10/1977 | Fed. Rep. of Germany . |
| 2826270 | 6/1978 | Fed. Rep. of Germany . |
| 2826489 | 3/1979 | Fed. Rep. of Germany ... 219/69 W |
| 2932734 | 8/1979 | Fed. Rep. of Germany . |
| 31512 | 3/1980 | Japan .............................. 219/69 W |
| 67876 | 11/1981 | Japan . |

OTHER PUBLICATIONS

European Search Report completed Apr. 7, 1983, Vienna.

Primary Examiner—M. H. Paschall
Attorney, Agent, or Firm—Staas & Halsey

[57] ABSTRACT

When cutting an arc or a corner in a workpiece on a wire-cut electric discharge machine, discharge power as required on rectilinear cutting is corrected on the basis of the amount of flexing of a wire electrode during rectilinear cutting and an amount of flexing of the wire electrode permitted in view of a tolerance in arc or corner cutting. The tension of the wire electrode is also adjusted and the speed of relative movement between the wire electrode and the workpiece is controlled. Dependent on whether a convex surface or a concave surface is cut in the workpiece, the rate at which the tension of the wire electrode and the speed of relative movement are proportional to each other is changed.

4 Claims, 10 Drawing Figures

METHOD OF CONTROLLING WIRE-CUT ELECTRIC DISCHARGE CONTOUR MACHINES ERRORS

BACKGROUND OF THE INVENTION

The present invention relates to a method of controlling a wire-cut electric discharge machine to cut a workpiece thereon along an arc or a corner with increased accuracy.

In particular the present invention relates to wire-cut electric discharge machines having a pair of upper and lower wire guides and a wire electrode extending therebetween and kept taut for applying a voltage across a gap between the wire electrode and a workpiece to produce spark discharge across the gap, thereby cutting the workpiece with discharge energy. The workpiece can be cut to a desired contour by moving the workpiece with respect to the wire electrode under cutting command data. As shown in FIG. 1, when the wire electrode 1 moves in and along a slot 3 in a given direction while cutting off the workpiece 2, a pressure is developed between the wire electrode 1 and the workpiece 2 due to the electric discharge to push back the wire electrode 1 in the direction of the arrows which is opposite to the direction in which the wire electrode 1 moves along, as shown in FIG. 2. The wire electrode 1 is therefore backed off or flexes from the position of the wire guides 4, 4. The cutting acuracy is not adversely affected to an appreciable extent by the amount of such wire flexing as long as the wire electrode 1 cuts the workpiece 2 along a rectilinear slot. However, when the workpiece changes its direction of relative movement through, for example, a right angle under a cutting command to cut a corner as shown in FIG. 3, the wire electrode has a tendency to be dragged inwardly of the corner due to the flexing of the wire electrode at a position in which the electric discharge takes place, with the result that the contour of the slot 3 as it is cut becomes different from a commanded shape as shown by the solid lines and has its configuration 3a rendered blunt or beveled as shown by the dotted lines. A similar error is also caused when cutting the workpiece along an arc as shown in FIG. 4.

It is known that the blunt shapes of such arcuate or angular corners cut in workpieces can be improved by changing discharge conditions. However, there has not yet been developed and hence there has been a need for a method of effecting optimum corner cutting control under various cutting conditions.

SUMMARY OF THE INVENTION

Accordingly, it is an object of the present invention to provide a method of controlling a wire-cut electric discharge machine for minimzing any bluntness of an arcuate or angular corner cut in a workpiece under optimum discharge conditions for various cutting conditions.

According to the present invention, a method of controlling a wire-cut electric discharge machine to cut an arc or a corner in a workpiece includes the step of correcting discharge power as required on rectilinear cutting based on an amount of flexing of a wire electrode on rectilinear cutting plus an amount of flexing of the wire electrode permitted in view of a tolerance in arc or corner cutting. This correcting step reduces the amount of flexing of the wire electrode when it cuts the arc or corner in the workpiece, thereby reducing the amount of any bluntness at the arc or corner, and improving cutting accuracy. The method also includes the steps of increasing a tension to which the wire electrode is subjected, and reducing a speed at which the wire electrode and the workpiece move relatively to each other. These additional steps serve to decrease the bluntness of the cut shape and to minimize an increase in the time required to cut the workpiece. The method further has the step of changing a rate at which the tension and the relative speed are proportional to each other dependent on whether a convex or concave surface is being cut in the workpiece. This changing step enables the wire-cut electric discharge machine to accurately cut the workpiece to without an appreciable amount of bluntness in the resulting contour.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 5:
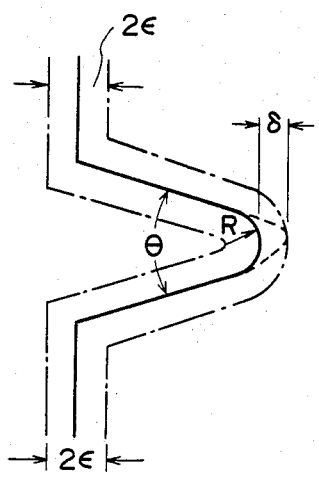
FIG. 5 is a plan view showing the principle of operation according to a method of the present invention.

In FIG. 5, a wire electrode 1 moves with respect to a workpiece with a center of the wire electrode 1 following a commanded path illustrated by the solid line, cutting a slot having a width $\epsilon$ on each side of the commanded path and defined by boundaries shown by the dot-and-dash lines. It is now assumed that when a corner is cut which has an angle $\theta$ and a radius R, there is developed bluntness or error due to flexing of the wire electrode at the corner by an amount $\delta$ as shown by the dotted line though the path of movement of the wire electrode 1 has been commanded along the solid line. The present inventors conducted experiments to determine the relationship between the amount of bluntness or error $\delta$ and the amount of flexing D of the wire electrode 1 under a variety of cutting conditions, and found the following approximate equation:

$$\delta = K \cdot \Delta R T^{\frac{3}{2}} \left(1 - \frac{\theta}{180}\right)^{\frac{1}{2}} \tag{1}$$

-continued where $$\Delta R_T = \left\{ D^2 + \left( R + \frac{4}{3\pi} \frac{\epsilon}{R} D \right)^2 \right\}^{\frac{1}{2}} - R \quad (2)$$

D is the amount of flexing of the wire electrode 1 upon corner cutting, $\epsilon$ is the half of the width of the slot which is cut, and K is a proportionality constant which ranges from 0.4 to 0.6 when $\epsilon$ and $\Delta R_T$ are expressed in mm.

Study of the equations (1), (2) shows that the angle $\theta$ and the radius R are determined solely by a shape to be cut, and hence the amount of bluntness or error $\delta$ is dependent on the amount of flexing D of the wire electrode 1. The wire electrode 1 is caused to flex under the pressure of spark discharge produced between the wire electrode 1 and the workpiece 2, and the amount of flexing D is proportional to discharge power P. Therefore, the following expression can be derived:

$$P \delta D \delta f(\delta) \quad (3)$$

This expression indicates that the amount of flexing D is proportional to the discharge power P, and the amount of bluntness $\delta$ can be varied by controlling the discharge power P.

When the discharge power P is zero, the amount of flexing D is also zero and hence the amount of bluntness $\delta$ is also zero. However, the fact that the discharge power P is zero means that no discharge cutting is effected. In practice, since the discharge power P is of a finite value, the amount of flexing and the amount of bluntness cannot be nil.

According to the present invention, a tolerable value $\delta o$ for the amount of bluntness $\delta$ is first determined, and then the discharge power P for the torelable amount is determined.

More specifically, with the tolerable value $\delta o$ and the shape data (angle $\theta$ and radius R) being known, an amount of flexing Do of the wire electrode 1 for the tolerable value $\delta o$ is determined from the equations (1) and (2). Then, discharge power P1 consumed upon rectilinear cutting and an amount of flexing D1 of the wire electrode 1 caused by the discharge power P1 are measured.

The discharge power P1 can be measured by finding a voltage Ve applied to the wire electrode 1 and a current flowing therethrough. Although the amount of flexing D1 of the wire electrode 1 can be measured by a measuring gage, it can also be measured automatically. The automatic flexing measurement can be effected by stopping the discharge, moving the wire electrode 1 and the workpiece 2 relative to each other, and detecting the interval 1 of their relative movement until the wire electrode 1 and the workpiece 2 are disengaged.

The discharge power P1, the amount of flexing D1, and discharge power Po for causing the amount of flexing Do as determined by the equations (1), (2) have the following mutual relationships:

$$\frac{Po}{Do} = \frac{P1}{D1} \quad (4)$$

-continued $$Po = \frac{Do}{D1} P1$$

Accordingly, the discharge power Po can be derived from the equation (4) using the discharge power P1 and the amount of flexing D1 which have been determined in advance, and the amount of flexing Do which has been found employing the tolerable value $\delta o$ and the shape data. When cutting an arcuate slot, the discharge power should be reduced to or below the ratio Do/D1 P1 with respect to the discharge power P1 consumed upon rectilinear cutting. The discharge power should start being reduced simultaneously with the starting of arcuate cutting or slightly before the starting of arcuate cutting, and the initial discharge power should be restored at the same time that the arcuate cutting is over. It is preferable that the discharge power be reduced in increments, but not instantly all the way to a reduced level.

The discharge power can be changed by varying the peak value of a discharge current, or varying intervals of time in which the supply of a current is turned on and off. For capacitor discharging systems, the capacitance of the capacitor can be changed for varied discharge power. Where a servo feed mode in which a constant mean voltage is applied for cutting is employed for servo feed control of relative movement of the wire electrode and the workpiece, the discharge power and the feeding speed are controlled in proportion to each other with the result that no change will be caused in the width of a slot being cut.

The method of the present invention attempts not only to reduce the amount of bluntness, but also to improve the shape of a blunt corner which is cut. The above-described method is concerned only with how to reduce the amount of bluntness, but the workpiece can be cut with higher accuracy by improving distortions in shape of other corner portions.

Figure 6:
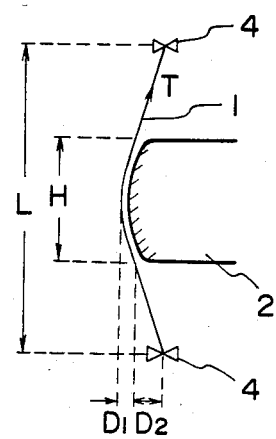
FIGS. 6 and 7 are views explantory of corrective arithmetic operations according to the present invention.

To this end, the wire electrode 1 is kept under a tension T which progressively increases as the discharge power is reduced. FIG. 6 is illustrative of the relationship between the tension T and the amount of flexing D of the wire electrode 1. Assuming that the tension is expressed by T, the distance between the wire electrode guides 4, is L, and the width or distance between the opposite surfaces of the workpiece 2 is H, the following equations can be set up:

$$D = D_1 + D_2 \quad (5)$$

$$D_1 = \frac{N \cdot H}{4T} \quad (6)$$

$$D_2 = \frac{L - H}{2T} \cdot N \quad (7)$$

Where N is the force that the wire electrode 1 undergoes due to the discharge.

The above equations show that the amount of flexing D is in inverse proportion to the tension T, and henced the amount of flexing D becomes reduced and the amount of bluntness becomes smaller as the tension T is increased. When the tension T is increased, the magnitude of oscillation of the wire electrode is reduced, resulting in a reduced width of a slot being cut. Therefore, it is necessary that the feeding speed be reduced in proportion to the tension T, or the mean cutting voltage be increased for servoed feeding. Since a reduction in the cutting speed which is required by an increase in the tension depends on the type of the discharge cutting power supply used and other factors, the degree by which the cutting speed should be reduced needs to be determined experimentally.

With the foregoing method, the amount of bluntness cannot be made smaller than the tolerable value $\delta o$. For cutting with higher accuracy required, the radius R should be corrected to correct the shape of a slot being cut.

Figure 7:
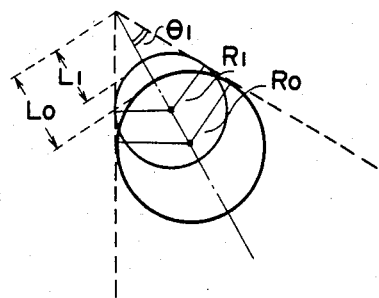
Figure 8:
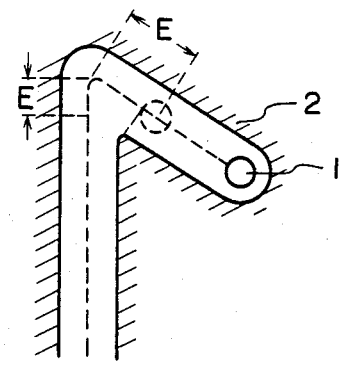
FIG. 8 is a plan view illustrating a region controlled according to the present invention.

FIG. 7 is explanatory of a mode of shape correction, in which a corrected radius $R_l$ is derived from a radius Ro to be cut. In FIG. 7, the radius R1 can be expressed geometrically as follows:

$$R_1 = (L_1 + R_1) \sin \frac{\theta_1}{2} \tag{8}$$

Hence, $$L_1 = \frac{R_1}{\sin \frac{\theta_1}{2}} - R_1 \tag{9}$$

Therefore, $$Lo - L_1 = \left( \frac{1}{\sin \frac{\theta_1}{2}} - 1 \right) \cdot (Ro - R_1) \tag{10}$$

By equalizing $(Lo - L_1)$ to $\delta o$, $$Ro - R_1 = \frac{\sin \frac{\theta_1}{2}}{1 - \sin \frac{\theta_1}{2}} \delta o \tag{11}$$

Hence, $$R_1 = Ro - \frac{\sin \frac{\theta_1}{2}}{1 - \sin \frac{\theta_1}{2}} \delta o \tag{12}$$

The workpiece should be cut with the radius $R_1$ thus determined.

Figure 1:
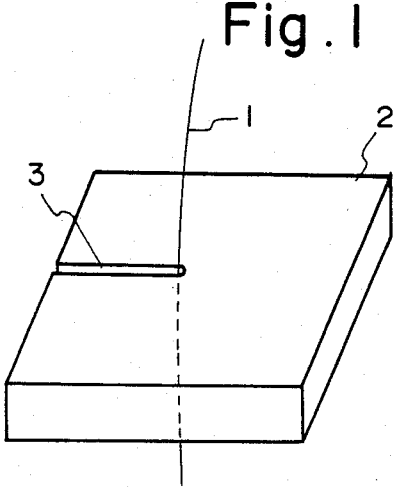
FIG. 1 is a perspective view illustrative of the principle on which a workpiece is cut by a wire electrode due to electric discharge.
Figure 2:
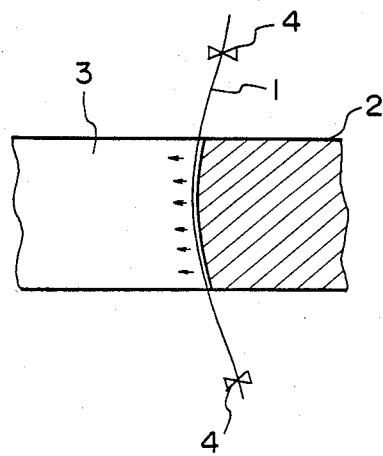
FIG. 2 is a fragmentary cross-sectional view explanatory of flexing of the wire electrode.
Figure 3:
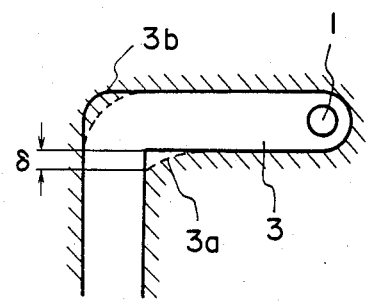
FIGS. 3 and 4 are plan views explanatory of problems with a conventional electric discharge cutting process.

The above method is based on the condition $R > \epsilon$. For cutting a corner with $R > \epsilon$, the wire electrode acts only on one side of an arcuate slot, resulting in a one-sided discharge condition. For example, such a one-sided discharge condition is experienced when cutting a corner with $R = 0$ as shown in FIG. 3, with the amount of bluntness $\delta$ at the corner being prevented from exceeding the amount of flexing D. Therefore, the discharge power P may be reduced until $Do = \delta o$ as in the foregoing example. This however may result in an instance in which the discharge power at the corner is excessively reduced until the relative speed of movement becomes 1/10 of the original speed. It is necessary to increase the overall time for cutting operation even when the region in which the discharge power should be reduced is limited to the corner. To avoid this condition, the tension of the wire electrode 1 should be increased at the same time that the discharge energy is reduced, as described above. This allows the amount of bluntness $\delta o$ and the tolerable amount of flexing Do to have the relationship $Do = K_2 \delta o$ with $K_2$ being permitted to range from 2 through 5, and hence the amount of flexing Do may be greater for the same amount of bluntness $\delta o$. The greater amount of flexing Do permitted means that the relative speed of movement of the wire electrode and the workpiece may be larger, thus improving the problem of the reduction in the cutting speed. This also reduces the problem of a blunt corner which would be caused by the wire electrode displaced in an opposite direction due to the one-sided electric discharge.

As described above, reduction of the discharge power and tension control should be combined for cutting corners and small arcs with $R \leq \epsilon$. It is most preferable to determine the region in which the discharge power is reduced as follows:

For cutting a corner or a small arc, the discharge power should be reduced in a region starting at a position slightly before the area of the corner or small arc (that is, the position located ahead 1 to 2 times the distance E which is the amount of flexing of the wire electrode) and ending at a position in which the wire electrode completely enters the next path. For cutting an arcuate corner, the region in which the discharge power is to be reduced should extend to a position in which the wire electrode moves past the arc into the following path. After the wire electrode has entered the region, the discharge power should progressively be restored to the original level.

To provide better cutting precision for substantially eliminating any error, there is known a method of changing the cutting path and a method of changing the cutting conditions in addition to the method described above. The method of changing the cutting path results in a compliated corrected path, and hence is practically infeasible. Various processes have been proposed for varying the cutting conditions. One of the better processes is to change the width of a slot being cut.

Figure 4:
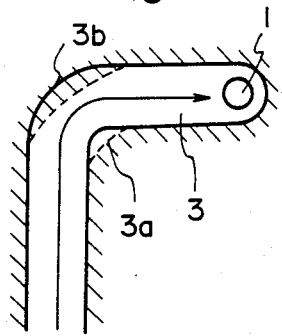

According to the present invention, the speed at which the workpiece and the wire electrode are moved relatively to each other is controlled dependent on whether the surface to be cut with accuracy is convex (as shown at 3a in FIGS. 3 and 4) or concave (as shown at 3b in FIGS. 3 and 4). More specifically, for the foregoing tension control, the ratio at which the tension is proportional to the mean cutting voltage is selected to be larger in cutting a convex surface and smaller in cutting a concave surface. This allows the speed of the relative movement to be much greater when a convex surface is being cut, resulting in a smaller slot width and a reduced degree of bluntness at the convex corner. When a concave surface is cut, the speed of the relative movement is rendered much smaller, with the consequences that the width of the slot becomes greater, and the concave surface can be cut deeply to reduce the bluntness of the concave corner.

A wire-cut electric discharge cutting machine for effecting the method of the present invention will be described in detail.

Figure 9:
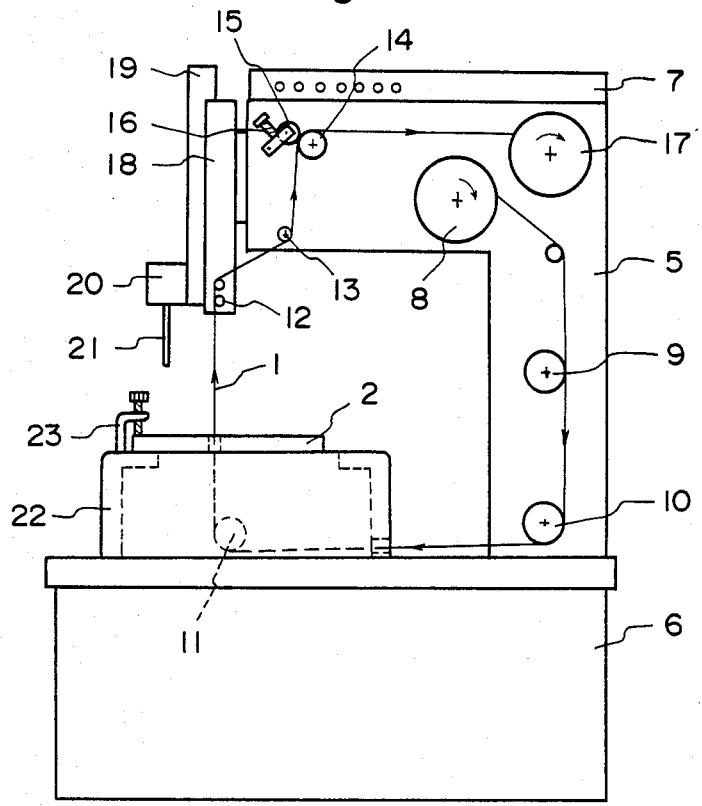
FIG. 9 is a side elevational view of a wire-cut electric discharage machine for carrying out the method of the present invention.

As shown in FIG. 9, the wire-cut electric discharge cutting machine comprises an inverted L-shaped column 5 mounted on and projecting upwardly from a base 6, the column 5 supporting thereon a capacitor box 7 serving as a power supply. A workpiece attachment table 22 is mounted on the base 6 and movable thereon two-dimensionally by motors for driving the table 22 in X- and Y-directions. A workpiece 2 is fastened to the workpiece attachment table 22 by a clamp 23. A wire electrode 1 is fed along in the directions of the arrows while the workpiece is being cut by electric discharge. The wire electrode 1 is unwound from a feed reel 8 supporting a roll of unused wire electrode and is coiled around a brake roller 9 which serves to brake the wire electrode 1 in the direction in which the latter is fed or pulled out, for thereby giving the wire electrode 1 a tension T. The wire electrode 1 is further trained around a roller 10, a lower guide roller 11, an upper guide roller 12, a roller 13, and a feed roller 14 which is rotatable by a drive motor for feeding the wire electrode 1. A pinch roller 15 is positioned adjacent to the feed roller 14 and urged by a spring 16 to press the wire electrode 1 against the feed roller 14. The wire electrode 1 as it has been used is wound up by a takeup reel 17. The column 5 supports on its distal end a movable member 18 on which there is mounted a slider 19 movable in a Z-direction and supporting a boring unit 20 having a boring tool 21 for forming a hole in the workpiece 2 from which cutting operation is started.

Figure 10:
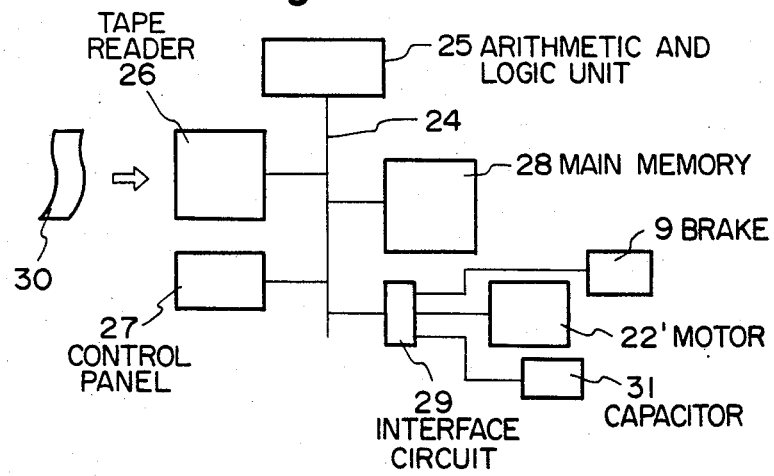
FIG. 10 is a block diagram of a control unit for the wire-cut electric discharge machine shown in FIG. 9.

FIG. 10 shows in block form a control unit for controlling the wire-cut electric discharge cutting machine shown in FIG. 9. The control unit comprises an arithmetic and logical unit 25 such as a microprocessor, a tape reader 26 for reading cutting command data (such as starting-point data, ending-point data and the like) from an NC tape 30, a control panel 27 for commanding the thickness of a workpiece and the speed of feed thereof, a main memory 28 for storing the cutting command data as read from the NC tape 30 and a control program, and an interface circuit 29 connected to a motor 22' for moving the workpiece attachment table 22, the brake roller 9 for controllingly tensioning the wire electrode 1, and a capacitor 31 for controlling the discharge current flowing through the wire electrode 1. The above components of the control unit are connected to a bus 24.

In operation, the cutting command data are read by the tape reader 26 and stored together with the data commanded by the control panel 27 into the memory 28. The arithmetic and logical unit 25 is controlled by the control program stored in the memory 28 to control rotation of the motor 22' through the interface circuit 29 based on the data stored in the memory 28. At this time, the arithmetic and logical unit 25 reads the value of a discharge current $i_1$ and the value of a tension T1 preset at the time of rectilinear cutting out of the memory 28, and controls the capacitor 31 housed in the capacitor box 7 and the brake roller 9 through the interface circuit 29 based on the read data.

Under the control of the control program stored in the memory 28, the arithmetic and logical unit 25 effects the steps of carrying out the arithmetic operations expressed by the equations (1), (2) and (4) to compute a discharge current, increasing the tension T to increase the speed of feed in response thereto, and carrying out the arithmetic operation of the equation (12). Stated otherwise, the control program comprises instructions for executing the above steps.

In response to a command for cutting a corner or arc in the workpiece, the arithmetic and logical unit 25 reads cutting command data for the cutting command out of the memory 28 to compute corner angle data $\theta$. Then, the arithmetic and logical unit 25 determines a radius R from the cutting command data, reads a slot width $\epsilon$, a proportionality constant k, and a tolerable amount of bluntness $\delta o$ from the memory 28, and carries out the arithmetic operations given by the equations (1), (2) to compute a tolerable amount of flexing Do of the wire electrode. Thereafter, the arithmetic and logical unit 25 reads the value of discharge current $i_1$ and the amount of flexing D1 of the wire electrode stored in the memory 28 at the time of rectilinear cutting, and effects the arithmetic operation (4) to compute a discharge current io required when cutting the corner of the arc. To cut a corner or a small arc that needs tension control, the arithmetic and logical unit 25 added a fixed value $\Delta T$ to the given tension T to compute the increased tension $(T+\Delta T)$, and furthermore carries out an arithmetic operation to reduce the speed $v$ by $\Delta v$ which corresponds to the tension increase $\Delta T$. When controlling the speed at the convex and concave surfaces, the speed reduction $\Delta v$ should be varied dependent on the contour of the convex and concave surfaces. When it is necessary to make a radius correction, the arithmetic and logical unit 25 reads the radius R, the amount of bluntness $\delta o$ and the angle $\theta$, and executes the arithmetic operation expressed by the equation (12) to find a corrected radius $R_1$. In this manner, the arithmetic and logical unit 25 effects necessary arithmetic operations each time a command for cutting an arc or a corner is provided, and supplies data on a discharge current to the capacitor 31, data on a tension to the brake roller 9, and data on a radius and a speed to the motor 22' via the interface circuit 29 prior to initiating arc or corner cutting, for thereby controlling the discharge power consumed by the wire electrode 1, the tension thereof, and the movement of the workpiece attachement table 22 for improved cutting accuracy at the arc or corner.

With the method of the present invention, as described above, the discharge power as consumed on rectilinear cutting is corrected on the basis of the amount of flexing of the wire electrode on rectilinear cutting plus an amount of flexing thereof allowed in view of a tolerance in cutting an arc or corner in a workpiece. The wire electrode when cutting an arc or corner therefore flexes to a smaller amount, thus reducing the amount of bluntness at the arc or corner and increasing the cutting accuracy. This permits electric discharge cutting operation to find a wider range of applications. The method of the present invention can reduce the corner or arc bluntness to a much smaller degree and minimize an increase in the cutting time by increasing the tension of the wire electrode and at the same time reducing the speed of relative movement between the wire electrode and the workpiece. The present invention is also of high practical advantage in that convex and concave surfaces can be cut in a workpiece with high accuracy and without appreciable bluntness or error through changing the rate at which the tension and the speed of relative movement are proportional to each other as they are increased.

Although certain preferred embodiments have been shown and described in detail, it should be understood that many changes and modifications may be made therein without departing from the scope of the appended claims.

What we claim is:

1. A method of controlling a wire-cut electric discharge machine for applying a voltage between a wire electrode and a workpiece to generate electric discharge therebetween to cut the workpiece to a desired contour such as an arc or a corner while the workpiece is moved with respect to the wire electrode, said method comprising the steps of:
measuring an amount of flexing $D_1$ of the wire electrode which is caused during rectilinear cutting of the workpiece using a first discharge power $P_1$;

determining an allowable amount of flex Do of the wire electrode based upon a tolerable value of δo for the amount of bluntness δ of the contour of the workpiece;

correcting the discharge power based on the measured amount of flexing and the allowable amount of flexing of the wire electrode such that the discharge power is at or below Do/D1 P1; and cutting the contour in the workpiece with the corrected discharge power supplied to the wire electrode.

2. A method of controlling a wire-cut electric discharge machine for applying a voltage between a wire electrode and a workpiece to generate electric discharge therebetween to cut the workpiece to a desired slot contour such as an arc or a corner while the workpiece is moved with respect to the wire electrode, said method comprising the steps of:

measuring an amount of flexing of the wire electrode which is caused during rectilinear cutting of the workpiece using a discharge power;

determining an allowable amount of flexing of the wire electrode based upon a tolerable value for the amount of bluntness of the contour of the workpiece;

correcting the discharge power based on the measured amount of flexing and the allowable amount of flexing of the wire electrode;

increasing a tension to which the wire electrode is subjected; and lowering a speed of relative movement between the workpiece and the wire electrode in accordance with the increased tension to compensate for a change in the width of the slot which is caused by the increased tension.

3. A method according to claim 2, further including the step of correcting a radius of the arc or corner dependent on said tolerance.

4. A method of controlling a wire-cut electric discharge machine for applying a voltage between a wire electrode and a workpiece to generate electric discharge therebetween to cut the workpiece to a desired convex or concave contour such as an arc or a corner while the workpiece is moved with respect to the wire electrode, said method comprising the steps of:

measuring an amount of flexing of the wire electrode which is caused during rectilinear cutting of the workpiece using a discharge power;

determining an allowable amount of flexing of the wire electrode based upon a tolerable value for the amount of bluntness of the contour of the workpiece;

correcting the discharge power based on the measured amount of flexing and the allowable amount of flexing of the wire electrode;

increasing a tension to which the wire electrode is subjected;

lowering a speed of relative movement between the workpiece and the wire electrode in accordance with the increased tension; and changing a rate at which said tension of the wire electrode and said speed of relative movement are proportional to each other in dependence upon the cutting of a convex or a concave contour.

* * * * *

UNITED STATES PATENT AND TRADEMARK OFFICE
CERTIFICATE OF CORRECTION

PATENT NO. : 4,518,842
DATED : May 21, 1985
INVENTOR(S) : Haruki Obara

It is certified that error appears in the above-identified patent and that said Letters Patent is hereby corrected as shown below:

On the title page, Item (73) should read:
[73], "Ltd." should be --Ltd--.

Column 3, line 24, "$\int$" should be --$\oint$-- (first two occurrences).

Column 4, line 11, "Do/D1" should be --$\frac{Do}{D1}$--.

Column 8, line 66, "$D_1$" should be --$P_1$--.

Column 9, line 8, "Do/D1" should be --$\frac{Do}{D1}$--.

Signed and Sealed this

Seventeenth Day of September 1985

[SEAL]

Attest:

DONALD J. QUIGG

Attesting Officer

Commissioner of Patents and
Trademarks—Designate